(12) United States Patent
Asai et al.

(10) Patent No.: US 10,988,180 B2
(45) Date of Patent: Apr. 27, 2021

(54) CAB MOUNT

(71) Applicant: TOYOTA JIDOSHA KABUSHIKI KAISHA, Toyota (JP)

(72) Inventors: Tetsuya Asai, Miyoshi (JP); Sentaro Tasaka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 57 days.

(21) Appl. No.: 16/405,495

(22) Filed: May 7, 2019

(65) Prior Publication Data

US 2019/0344831 A1   Nov. 14, 2019

(30) Foreign Application Priority Data

May 9, 2018 (JP) .............................. JP2018-090840

(51) Int. Cl.
*B62D 24/02*   (2006.01)
*F16F 15/08*   (2006.01)
*F16F 3/087*   (2006.01)

(52) U.S. Cl.
CPC ............ *B62D 24/02* (2013.01); *F16F 3/0873* (2013.01); *F16F 15/08* (2013.01)

(58) Field of Classification Search
CPC ....... B62D 24/02; B62D 27/04; F16F 1/3735; F16F 1/37; F16F 1/3732; F16F 3/0873; F16F 3/0876; F16F 3/093; F16F 15/08; F16F 2236/04; F16B 5/0258
USPC ...... 267/141, 142, 141.5, 141.7, 141.4, 153; 248/634, 638
See application file for complete search history.

(56) References Cited

U.S. PATENT DOCUMENTS

| 4,215,842 | A | * | 8/1980 | Brenner | F16F 13/24 248/634 |
| 5,799,930 | A | * | 9/1998 | Willett | B62D 24/02 267/141.4 |
| 6,435,489 | B1 | * | 8/2002 | Rice | F16F 1/3732 248/635 |
| 2006/0202101 | A1 | * | 9/2006 | Dickson | F16F 1/3735 248/638 |
| 2009/0134292 | A1 | * | 5/2009 | Kubat | F16F 3/093 248/222.51 |

FOREIGN PATENT DOCUMENTS

JP   2004-291795 A   10/2004

* cited by examiner

*Primary Examiner* — Robert A. Siconolfi
*Assistant Examiner* — San M Aung
(74) *Attorney, Agent, or Firm* — Sughrue Mion, PLLC (57) ABSTRACT

A cab mount for attaching a frame to a body is provided to prevent a forcible movement of the body generated under the influence of vertical vibration of the frame. A first cab mount includes: a collar extending vertically; and an upper mount rubber and a lower mount rubber disposed to face in the upper-lower direction on an outer periphery of the collar. The collar is attached to a body of a vehicle by being inserted into an attachment hole of a ladder frame of the vehicle while a peripheral part of the attachment hole is positioned between the upper mount rubber and the lower mount rubber. The upper mount rubber is spaced apart from the ladder frame in the upper-lower direction by a first predetermined distance while the lower mount rubber is spaced apart from the ladder frame in the upper-lower direction by a second predetermined distance.

5 Claims, 8 Drawing Sheets

FIG.14 Prior Art

CAB MOUNT

CROSS-REFERENCE TO RELATED APPLICATIONS

The present application claims priority under 35 U.S.C. § 119(a) to Japanese Patent Application No. 2018-90840, filed on May 9, 2018. The contents of this application are incorporated herein by reference in its entirety.

TECHNICAL FIELDS

The present invention relates to cab mounts to attach a frame to a body of a vehicle with body-on-frame construction.

BACKGROUND ART

Conventionally, in a body-on-frame vehicle with a ladder frame or the like, the frame is attached to the body via cab mounts having a rubber elastic body in order to reduce vibration transmitted from the frame to the body.

The cab mount that is frequently used in the above case is a cab mount including an upper-side rubber elastic body and a lower-side rubber elastic body that are disposed so as to face each other in the upper-lower direction on the outer periphery of a vertically extending collar (also called as a sleeve). In this cab mount, the collar is inserted into an attachment hole formed in the frame while a peripheral part of the attachment hole is sandwiched between the upper-side rubber elastic body and the lower-side rubber elastic body in the upper-lower direction. Then, the inserted collar is bolt-fastened to the body, and thus the frame is attached to the body.

For example, Patent Document 1 discloses a cab mount to be attached such that the upper mount rubber (upper-side rubber elastic body) and the lower mount rubber (lower-side rubber elastic body) sandwich the frame in the upper-lower direction, in which the lower mount rubber includes a bored part and a rigid restriction plate.

PRIOR ART DOCUMENT

Patent Document

Patent Document 1: JP 2004-291795 A

SUMMARY OF INVENTION

Problem to be Solved by the Invention

In the frame of a vehicle, wide frequency range vibration may be generated. Examples of the above vibration include: vibration in a relatively high frequency range caused by road surface input when the vehicle travels on a road surface having fine unevenness or caused by vibration of the power train; and vibration in a relatively low frequency range caused by road surface input when the vehicle travels on a slightly deteriorated paved road.

However, in the conventional cab mount as disclosed in Patent Document 1, the rigidity and the spring constant of the cab mount are defined in some degree by rubber characteristics of the rubber elastic body because of the configuration in which the upper-side rubber elastic body and the lower-side rubber elastic body sandwich the frame in the upper-lower direction.

Therefore, in the conventional cab mount, the transmission of the vertical vibration is reduced/attenuated to a certain extent in the frequency range corresponding to the rubber characteristics (for example, in the high frequency range), however, the transmission of the vertical vibration is not sufficiently reduced/attenuated in the frequency range not corresponding to the rubber characteristics (for example, in the low frequency range). As a result, the body is forced to move by the vertical vibration of the frame.

Here, a liquid sealed mount may be adopted as the cab mount, which is capable of optimizing the vibration transmission characteristics by fine tuning. However, such a liquid sealed mount having a complicated configuration requires increase in manufacturing costs.

The present invention was made in consideration of the above circumstances, an object of which is to provide a technique to prevent the forcible movement of the body generated under the influence of the vertical vibration of the frame, using a cab mount having a simple configuration to attach the frame to the body.

Means for Solving the Problem

In order to achieve the above object, the rigidity and the spring constant of a cab mount of the present invention is brought close to zero as possible with respect to an amplitude not more than a predetermined value. Thus, the vertical vibration of a frame is prevented from being transmitted to a body, regardless whether the vibration is in the high frequency range or in the low frequency range.

Specifically, the present invention is to provide a cab mount that includes: a collar extending vertically; and an upper-side rubber elastic body and a lower-side rubber elastic body that are disposed so as to face each other in the upper-lower direction on an outer periphery of the collar. The collar is attached to a body of a vehicle by being inserted into an attachment hole formed in a frame of the vehicle while a peripheral part of the attachment hole is positioned between the upper-side rubber elastic body and the lower-side rubber elastic body.

In the above-described cab mount, the upper-side rubber elastic body is spaced apart from the frame in the upper-lower direction by a first predetermined distance while the lower-side rubber elastic body is spaced apart from the frame in the upper-lower direction by a second predetermined distance.

This configuration is different from the conventional configuration in which the frame is sandwiched between the upper-side rubber elastic body and the lower-side rubber elastic body. Although the frame is also positioned between the upper-side rubber elastic body and the lower-side rubber elastic body in this configuration, the upper-side rubber elastic body and the lower-side rubber elastic body are spaced apart from the frame, respectively upwardly by the first predetermined distance and downwardly by the second predetermined distance. Thus, it is possible to bring the rigidity and the spring constant of the cab mount substantially to zero with respect to the vertical vibration with the amplitude not more than the first predetermined distance and the second predetermined distance. Therefore, it is possible to prevent the vertical vibration from being transmitted from the frame to the body regardless whether the vibration is in the high frequency range or in the low frequency range. Thus, it is possible to prevent the forcible movement of the body that is generated under the influence of the vertical vibration of the frame.

Furthermore, when the vertical vibration with the amplitude more than the first predetermined distance and the second predetermined distance occurs, the upper-side rubber elastic body and the lower-side rubber elastic body make contact with the peripheral part of the frame so that they each serve as a stopper. Thus, it is possible to attenuate the vibration while preventing excessive deformation of the frame, and also to prevent the strength of the frame from being affected.

As another aspect of the present invention to reduce the transmission of the vibration from the frame to the body, a cab mount is provided, which includes: a collar extending vertically; and an upper-side rubber elastic body and a lower-side rubber elastic body that are disposed so as to face each other in the upper-lower direction on an outer periphery of the collar. The collar is attached to a body of a vehicle by being inserted into an attachment hole formed in a frame of the vehicle while a peripheral part of the attachment hole is positioned between the upper-side rubber elastic body and the lower-side rubber elastic body. A lower end part of the upper-side rubber elastic body, which faces the peripheral part of the frame, is formed such that a horizontal cross section area of the lower end part gradually decreases downward, and an upper end part of the lower-side rubber elastic body, which faces the peripheral part of the frame, is formed such that a horizontal cross section area of the upper end part gradually decreases upward.

In the above-described configuration, the horizontal cross section area of the lower end part of the upper-side rubber elastic body gradually decreases downward while the horizontal cross section area of the upper end part of the lower-side rubber elastic body gradually decreases upward. Thus, the respective amounts of rubber of the upper-side rubber elastic body and the lower-side rubber elastic body are minimized at the respective parts of the upper-side rubber elastic body and the lower-side rubber elastic body closest to the frame. Therefore, at the beginning of the contact of the frame with the upper-side rubber elastic body and the lower-side rubber elastic body, the rigidity and the spring constant of the cab mount can be brought substantially to zero. Thus, it is possible to prevent the vertical vibration from being transmitted from the frame to the body, which leads to reduction in the forcible movement of the body that is generated under the influence of the vertical vibration of the frame.

On the other hand, the respective horizontal cross section areas of the lower end part of the upper-side rubber elastic body and the upper end part of the lower-side rubber elastic body (in other words, the respective amounts of rubber thereof) gradually increase as the horizontal cross section areas are spaced apart from the frame. Accordingly, when the vertical vibration with a relatively large amplitude occurs, the load can be sustained with relatively large rigidity and spring constant. Thus, it is possible to attenuate the vibration while preventing excessive deformation of the frame, and also to prevent the strength of the frame from being affected.

Also in the above-described cab mount, it is preferable that a lower end of the upper-side rubber elastic body is spaced apart from the frame in the upper-lower direction while an upper end of the lower-side rubber elastic body is spaced apart from the frame in the upper-lower direction.

In the above-described configuration, the respective horizontal cross section areas of the upper-side rubber elastic body and the lower-side rubber elastic body gradually decrease as the horizontal cross section areas are close to the peripheral part of the frame. In addition, the lower end of the upper-side rubber elastic body and the upper end of the lower-side rubber elastic body are respectively spaced apart from the frame in the upper-lower direction. Thus, the rigidity and the spring constant of the cab mount can be brought substantially close to zero until the peripheral part of the frame comes in contact with the upper-side rubber elastic body and the lower-side rubber elastic body. Thus, it is possible to further prevent the vertical vibration from being transmitted from the frame to the body, which reliably leads to reduction in the forcible movement of the body that is generated under the influence of the vertical vibration of the frame.

Also in the above-described cab mount, it is preferable that a middle-side rubber elastic body, which is a separate body from the upper-side rubber elastic body and the lower-side rubber elastic body, is attached to an outer peripheral surface of the collar between the upper-side rubber elastic body and the lower-side rubber elastic body so as to surround the outer peripheral surface, and that a peripheral surface of the attachment hole makes contact with the middle-side rubber elastic body in a vertically slidable manner.

In the above-described configuration, since the peripheral surface of the attachment hole formed in the frame makes contact with the middle-side rubber elastic body that is attached to the outer peripheral surface of the collar so as to surround the outer peripheral surface, it is possible to sustain the load applied in the front and back, and right and left directions so that the load is reduced/attenuated. Furthermore, since the peripheral surface of the attachment hole makes contact, in a vertically slidable manner, with the middle-side rubber elastic body, it is possible to prevent the load applied in the upper-lower direction from being transmitted to the body via the middle-side rubber elastic body.

Also in the above-described cab mount, it is preferable that a protrusion extending outward in a diameter direction is provided on the middle-side rubber elastic body so as to surround the middle-side rubber elastic body, and that the peripheral surface of the attachment hole makes contact with the protrusion in a vertically slidable manner.

In the above-described configuration, since the peripheral surface of the attachment hole formed in the frame makes contact with the protrusion of the middle-side rubber elastic body in a vertically slidable manner, the contact area of the frame with the middle-side rubber elastic body can be relatively reduced. Thus, it is possible to further prevent the vertical vibration of the frame from being transmitted to the body via the middle-side rubber elastic body.

Also, it is preferable that the above-described cab mount is attached to the body in a vicinity of a suspension provided on the frame.

For example, the resonance frequency of the suspension caused by the road surface input when the vehicle travels on a slightly deteriorated paved road is close to the natural frequency of the vehicle. However, in the above-described configuration, the cab mount that is capable of reducing the rigidity and the spring constant substantially to zero is attached to the body in the vicinity of the suspension. Thus, it is possible to preferably prevent the forcible movement of the body caused by the vertical vibration close to the natural frequency of the vehicle.

Advantageous Effect of the Invention

As described above, a cab mount with a simple configuration according to the present invention can prevent the forcible movement of the body that is generated under the influence of the vertical vibration of the frame.

BRIEF DESCRIPTION OF THE DRAWINGS

FIGS. 4(a) and 4(b) are simulation result diagrams schematically illustrating the relationship between the ladder frame and a body when vibration in the upper-lower direction is applied. FIG. 4(a) shows a case in which a conventional first cab mount is adopted. FIG. 4(b) shows a case in which the first cab mount is detached.

DESCRIPTION OF EMBODIMENTS

Hereinafter, embodiments of the present invention will be described with reference to the drawings.

First Embodiment

—Overall Configuration—

Figure 1:
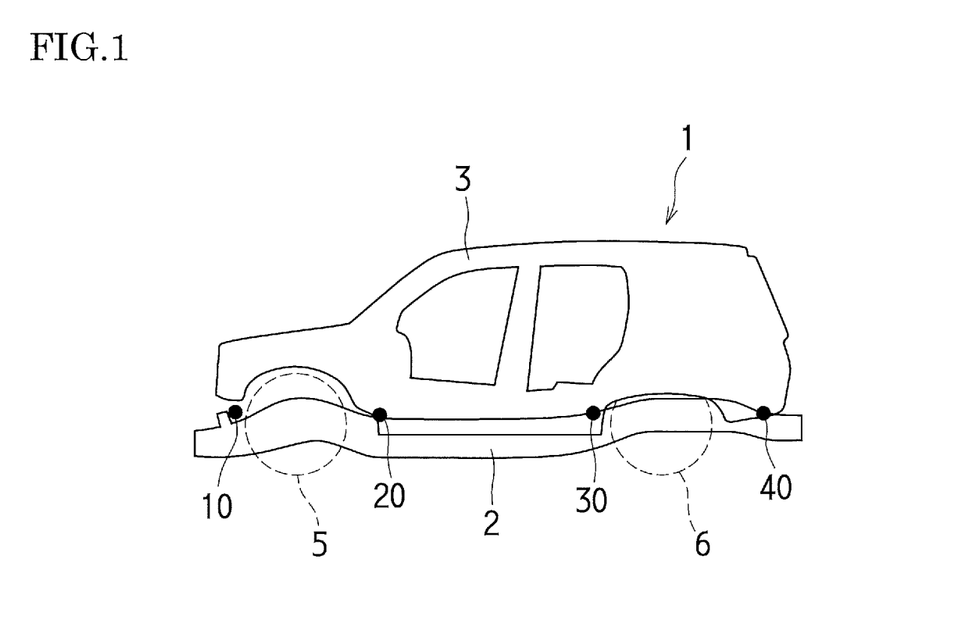
FIG. 1 is a side view schematically illustrating a vehicle having a ladder frame according to the first embodiment of the present invention.
Figure 2:
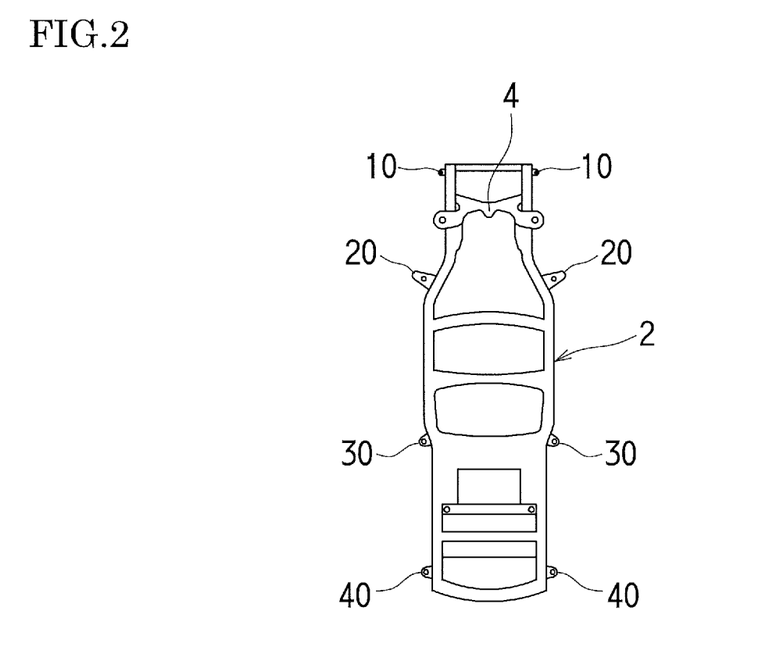
FIG. 2 is a plan view schematically illustrating the ladder frame.

FIG. 1 is a side view schematically illustrating a vehicle 1 having a ladder frame 2 according to this embodiment. FIG. 2 is a plan view schematically illustrating the ladder frame 2. In the vehicle 1 shown in FIGS. 1 and 2, the ladder frame 2 is attached to the body 3 via 8 cab mounts 10, 20, 30 and 40 that are arranged in a bilaterally symmetrical manner on the ladder frame 2. More specifically, the ladder frame 2 is attached to the body 3 via: a pair of right and left first cab mounts 10 disposed in front of a suspension 4; a pair of right and left second cab mounts 20 disposed behind respective front wheels 5; a pair of right and left third cab mounts 30 disposed in front of respective rear wheels 6; and a pair of right and left fourth cab mounts 40 disposed at the rear end of the vehicle 1.

—Second and Third Cab Mounts—

Figure 3:
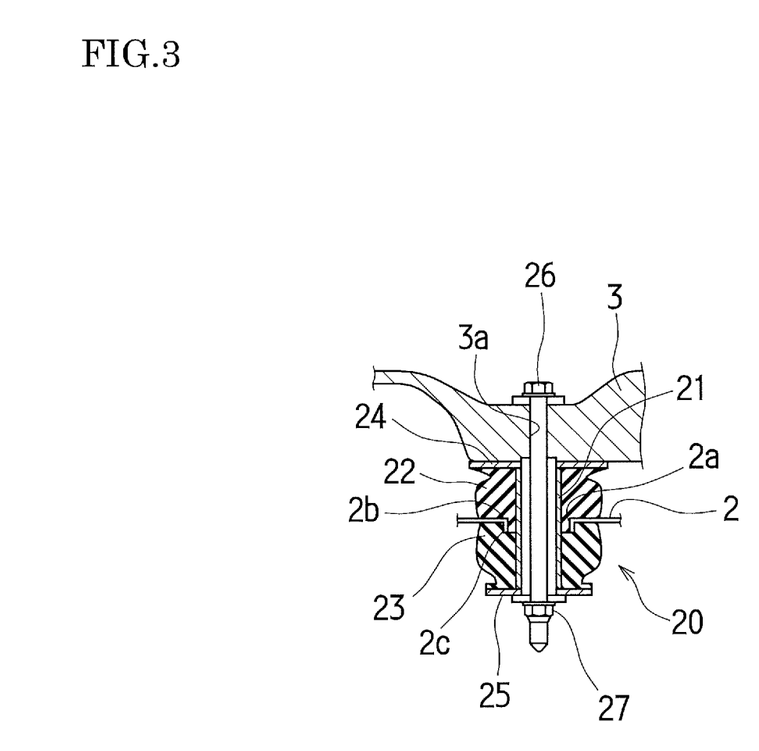
FIG. 3 is a cross-sectional view schematically illustrating a third cab mount.

FIG. 3 is a cross-sectional view schematically illustrating the second cab mount 20. As shown in FIG. 3, the second cab mount 20 includes: a collar 21; an upper mount rubber 22; a lower mount rubber 23; an upper retainer 24; a lower retainer 25; a bolt 26; and a nut 27. The second cab mount 20 attaches the ladder frame 2 to the body 3 with a part thereof being inserted into an attachment hole 2a formed in the ladder frame 2 and also into an attachment hole 3a formed in the body 3. A part of a peripheral part 2b of the ladder frame 2 is bent so as to form an annular wall part 2c that surrounds the attachment hole 2a.

The collar 21 is formed to have a cylindrical shape. The inner diameter thereof is set larger than the inner diameter of the attachment hole 3a of the body 3 while the outer diameter thereof is set smaller than the inner diameter of the attachment hole 2a of the ladder frame 2.

The upper mount rubber 22 is formed thick and to have a substantially cylindrical shape, whose inner diameter is substantially the same as the outer diameter of the collar 21. The upper retainer 24 is formed to have a disc shape, and has a through hole in the center part thereof. The inner diameter of the through hole is set smaller than the inner diameter of the collar 21. The top surface of the upper mount rubber 22 is vulcanized and adhered to the bottom surface of the upper retainer 24.

The lower mount rubber 23 is formed thick and to have a substantially cylindrical shape, whose inner diameter is substantially the same as the outer diameter of the collar 21. The lower retainer 25 is formed to have a disc shape, and has a through hole in the center part thereof. The inner diameter of the through hole is set smaller than the inner diameter of the collar 21. The bottom surface of the lower mount rubber 23 is vulcanized and adhered to the top surface of the lower retainer 25.

The second cab mount 20 is attached to the body 3 through the following steps: the collar 21 is inserted into the attachment hole 2a of the ladder frame 2; the upper mount rubber 22 and the lower mount rubber 23 are fitted to the collar 21 respectively from the above and from the below so as to sandwich the collar 21 by the upper retainer 24 and the lower retainer 25 and also to sandwich the peripheral part 2b of the attachment hole 2a in the upper-lower direction by the upper mount rubber 22 and the lower mount rubber 23; then the bolt 26, which is inserted into the attachment hole 3a of the body 3, is furthermore inserted into a through hole of the upper retainer 24, the collar 21, and a through hole of the lower retainer 25 in this order (i.e. from the above); and the nut 27, which is screwed with the bolt 26, is tightened.

In the second cab mount 20 configured as described above, the upper mount rubber 22 and the lower mount rubber 23 are compressed by the amount of preliminary compression defined by the collar 21 that is sandwiched by the upper retainer 24 and the lower retainer 25. Since the peripheral part 2b of the ladder frame 2 is sandwiched by such compressed upper mount rubber 22 and lower mount rubber 23, vibration generated in ladder frame 2 because of the road surface input and/or the vibration of the power train is reduced/attenuated to be transmitted to the body 3.

The third and fourth cab mounts 30 and 40 each have almost the same configuration as that of the second cab mount 20 except for the size and the like of the upper mount rubber and the lower mount rubber. Thus, detail description on the third and fourth cab mounts 30 and 40 is omitted.

—First Cab Mount—

Hereinafter, the first cab mount 10 will be described. In order to facilitate the understanding of this embodiment, a conventional first cab mount 110 is described first.

Figure 13:
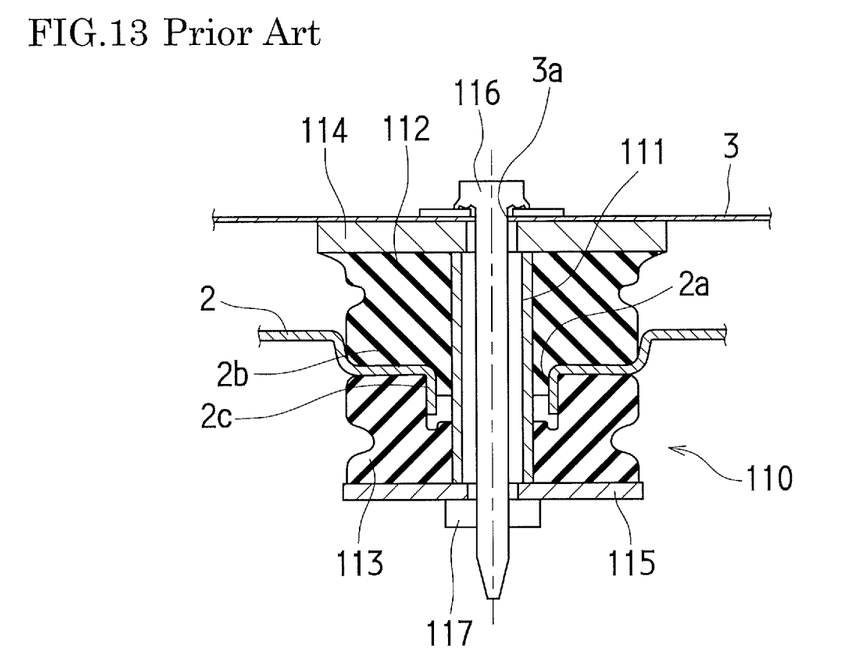
FIG. 13 is a cross-sectional view schematically illustrating the conventional first cab mount.
Figure 14:
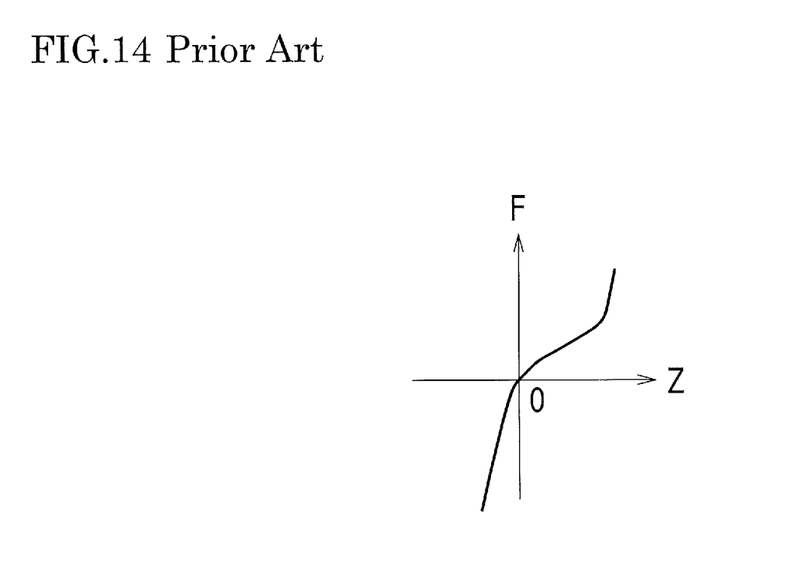
FIG. 14 is a graph schematically indicating the relationship between displacement of the ladder frame in the upper-lower direction and load characteristics of the conventional first cab mount.

FIG. 13 is a cross-sectional view schematically illustrating the conventional first cab mount 110. FIG. 14 is a graph schematically indicating the relationship between displacement of the ladder frame 2 in the upper-lower direction and load characteristics of the conventional first cab mount 110. In the conventional first cab mount 110 shown in FIG. 13, a collar 111, an upper mount rubber 112, a lower mount rubber 113, an upper retainer 114, a lower retainer 115, a bolt 116 and a nut 117 are almost the same, respectively, as the collar 21, the upper mount rubber 22, the lower mount rubber 23, the upper retainer 24, the lower retainer 25, the bolt 26 and the nut 27 of the second cab mount 20. Thus, a redundant part of the description is omitted.

In the ladder frame 2 to which the conventional first cab mount 110 is attached, wide frequency range vibration may be generated, for example, vibration in a relatively high frequency range caused by road surface input when the vehicle travels on a road surface having fine unevenness or by vibration of the power train, and vibration in a relatively low frequency range caused by road surface input when the vehicle travels on a slightly deteriorated paved road.

However, in the conventional first cab mount 110 shown in FIG. 13, the rigidity and the spring constant are defined in some degree by rubber characteristics of the mount rubbers 112 and 113 because of the configuration in which the upper mount rubber 112 and the lower mount rubber 113 sandwich the peripheral part 2b of the ladder frame 2 in the upper-lower direction. For example, the transmission of the vertical vibration is reduced/attenuated to a certain extent in the relatively high frequency range corresponding to the rubber characteristics, however in some cases, the transmission of the vertical vibration is not sufficiently reduced/attenuated in the relatively low frequency range not corresponding to the rubber characteristics.

The resonance frequency of the suspension 4 (for example, around 15 Hz) caused by the road surface input in the relatively low frequency range (for example, 20 Hz or less) is close to the natural frequency of the vehicle 1 (below the body 3) including the ladder frame 2 and the first cab mount 110. Therefore, it is particularly desired that the cab mount disposed in the vicinity of the suspension 4 reduces/attenuates the transmission of the vertical vibration in the relatively low frequency range. However, it is difficult for the conventional first cab mount 110 to reduce/attenuate sufficiently the transmission of the vertical vibration in the relatively low frequency range. As a result, the body 3 is in some cases forced to move by the vertical vibration of the ladder frame 2 in the low frequency range.

Figure 4A:
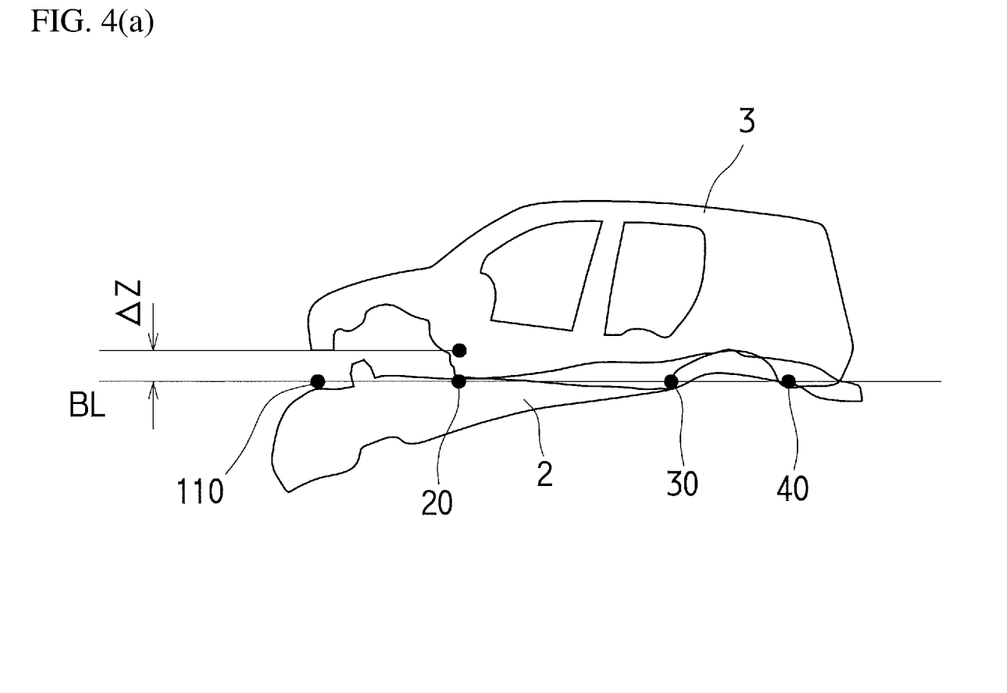
Figure 4B:
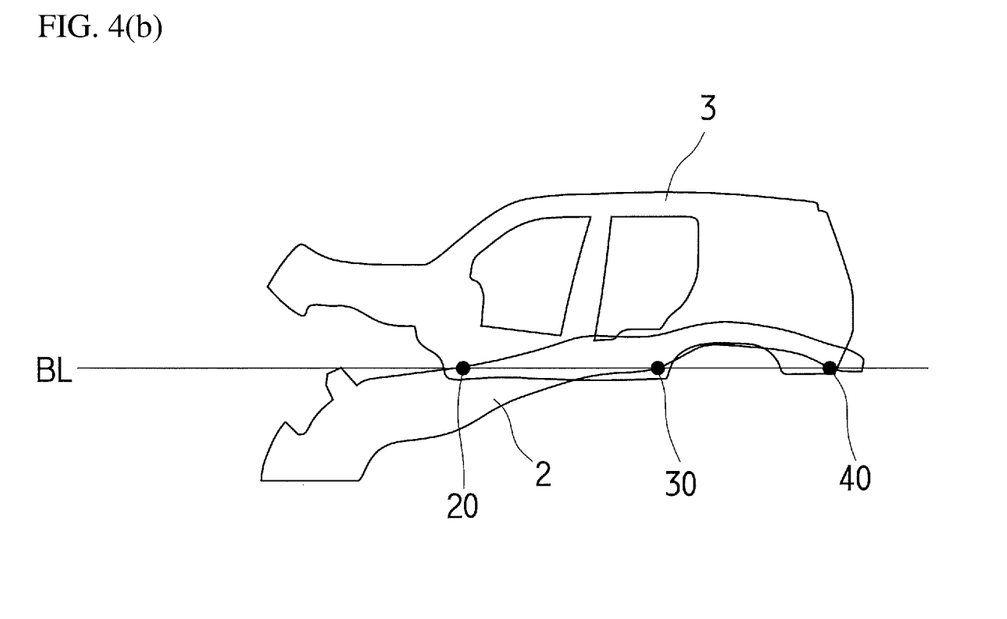

4(a) and 4(b) are simulation result diagrams schematically illustrating the relationship between the ladder frame 2 and the body 3 when vibration in the upper-lower direction is applied. FIG. 4(a) shows a case in which the conventional first cab mount 110 is adopted. FIG. 4(b) shows a case in which the first cab mount is detached. These simulation result diagrams schematically show the relationship between the ladder frame 2 and the body 3 assuming that vertical vibration equivalent to the road surface input when the vehicle travels on a slightly deteriorated paved road (i.e. the road surface input in the relatively low frequency range) is applied to the ladder frame 2. Note that in FIGS. 4(a) and 4(b), the displacement of the ladder frame 2 and the body 3 is exaggeratedly illustrated for the sake of visibility.

As shown in FIG. 4(a), when the conventional first cab mount 110 was adopted, it was confirmed that: the transmission of the vertical vibration close to the natural frequency of the vehicle 1 was not sufficiently reduced/attenuated; and the body 3 was forced to move, at the feet placing floor part (beneath the feet of the vehicle occupant) of the front sheet near the second cab mount 20, by AZ from the reference level BL accompanying the vertical vibration in the low frequency range of the ladder frame 2. In contrast, as shown in FIG. 4(b), when the first cab mount itself was detached, it was confirmed that the movement of the body 3 at the feet placing floor part of the front sheet was reduced without being associated with the vertical vibration of the ladder frame 2. These simulation results show that it is effective to bring the rigidity and the spring constant of the cab mount close to zero as possible in order to prevent the transmission of the vertical vibration of the ladder frame 2 to the body 3.

However, in the conventional first cab mount 110 in which the upper mount rubber 112 and the lower mount rubber 113 sandwich the peripheral part 2b of the ladder frame 2 in the upper-lower direction, the displacement of the ladder frame 2 in the upper-lower direction (Z axis direction) inevitably generates the load F, as shown in FIG. 14. Thus, it is difficult to bring the rigidity and the spring constant of the cab mount close to zero as long as the above configuration (i.e. sandwiching the ladder frame 2 in the upper-lower direction by the upper mount rubber 112 and the lower mount rubber 113) is adopted.

Furthermore, it is certain that the movement of the body 3 associated with the vertical vibration of the ladder frame 2 is reduced when the first cab mount itself is detached, as shown in FIG. 4(b). However, in this case, there is no stopper that sustains the load applied to the ladder frame 2 so as to reduce/attenuate the vibration when the ladder frame 2 considerably vibrates in the upper-lower direction, which may affect the strength of the ladder frame 2.

Figure 5:
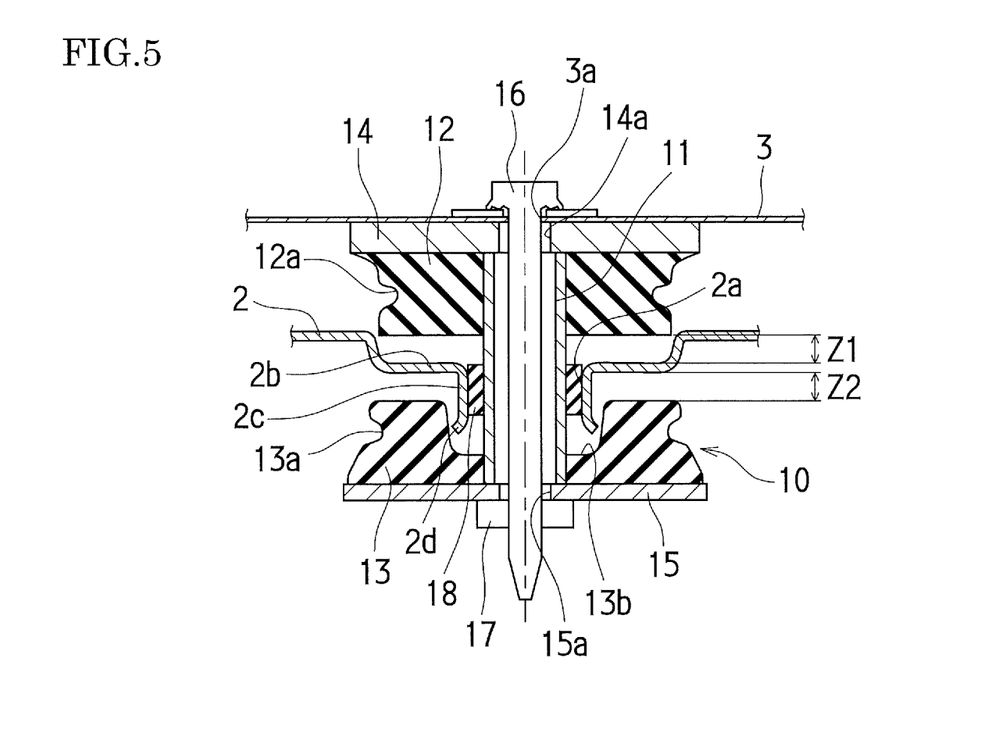
FIG. 5 is a cross-sectional view schematically illustrating a first cab mount of the present invention.

In consideration of the above circumstances, in this embodiment shown in FIG. 5, the first cab mount 10 includes: a collar 11 extending vertically; and an upper mount rubber 12 and a lower mount rubber 13 that are disposed so as to face each other in the upper-lower direction on the outer periphery of the collar 11. In the first cab mount 10, the collar 11 is attached to the body 3 by being inserted into the attachment hole 2a of the ladder frame 2 while the peripheral part 2b of the attachment hole 2a is positioned between the upper mount rubber 12 and the lower mount rubber 13. The upper mount rubber 12 is spaced apart from the ladder frame 2 in the upper-lower direction by a first predetermined distance Z1 while the lower mount rubber 13 is spaced apart from the ladder frame 2 in the upper-lower direction by a second predetermined distance Z2.

Figure 6:
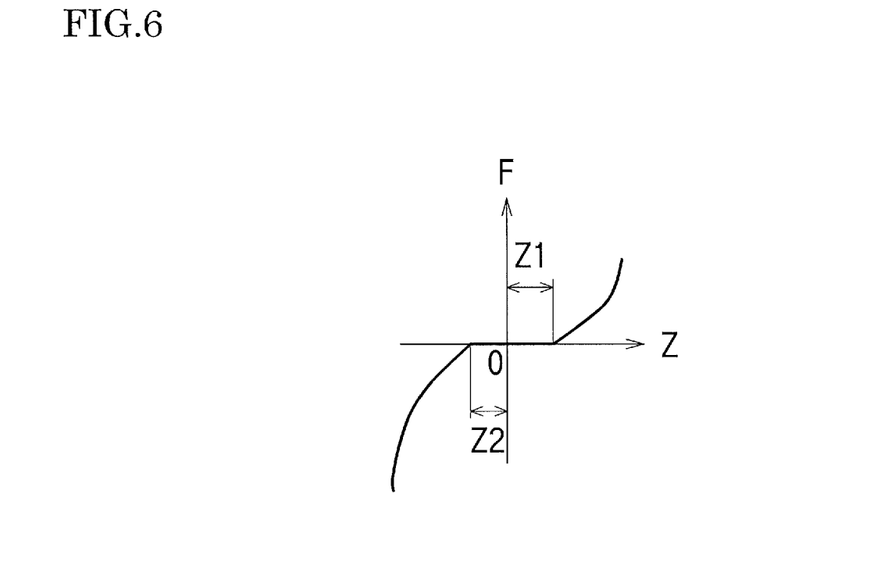
FIG. 6 is a graph schematically indicating the relationship between displacement of the ladder frame in the upper-lower direction and load characteristics of the first cab mount.

FIG. 5 is a cross-sectional view schematically illustrating the first cab mount 10. FIG. 6 is a graph schematically indicating the relationship between displacement of the ladder frame 2 in the upper-lower direction and load characteristics of the first cab mount 10. Note that in FIG. 5, the first predetermined distance Z1 and the second predetermined distance Z2 are exaggeratedly illustrated for the sake of visibility.

As shown in FIG. 5, the first cab mount 10 includes: the collar 11; the upper mount rubber 12; the lower mount rubber 13, an upper retainer 14; a lower retainer 15; a bolt 16; a nut 17; and a middle mount rubber 18.

The collar 11 is made of, for example, a metal material and formed to have a cylindrical shape. The inner diameter of the collar 11 is set larger than the inner diameter of the attachment hole 3a of the body 3 while the outer diameter of the collar 11 is set smaller than the inner diameter of the attachment hole 2a of the ladder frame 2.

The upper mount rubber (upper-side rubber elastic body) 12 made of rubber is formed thick and to have a substantially cylindrical shape, whose inner diameter is substantially the same as the outer diameter of the collar 11 so that the upper mount rubber 12 is externally fitted to the collar 11. As shown in FIG. 5, the height of the upper mount rubber 12 is set such that the bottom surface thereof is upwardly spaced apart from the top surface of the peripheral part 2b of the ladder frame 2 by the first predetermined distance Z1 in the state in which the ladder frame 2 is attached to the body 3 with the first cab mount 10. The upper retainer 14 is made of, for example, a metal material and formed to have a disc shape, and has a through hole 14a in the center part thereof. The inner diameter of the through hole 14a of the upper retainer 14 is set smaller than the inner diameter of the collar 11. The top surface of the upper mount rubber 12 is vulcanized and adhered to the bottom surface of the upper retainer 14 in the state in which the axis of the upper mount rubber 12 coincides with the axis of the through hole 14a. A bored part 12a is formed in the upper mount rubber 12, which advances deformation of the upper mount rubber 12.

The lower mount rubber (lower-side rubber elastic body) 13 made of rubber is formed thick and to have a substantially cylindrical shape, whose inner diameter is substantially the same as the outer diameter of the collar 11 so that the lower mount rubber 13 is externally fitted to the collar 11. As shown in FIG. 5, the height of the lower mount rubber 13 is set such that the top surface thereof is downwardly spaced apart from the bottom surface of the peripheral part 2b of the ladder frame 2 by the second predetermined distance Z2 in the state in which the ladder frame 2 is attached to the body 3 with the first cab mount 10. The lower retainer 15 is made of, for example, a metal material and formed to have a disc shape, and has a through hole 15a in the center part thereof. The inner diameter of the through hole 15a of the lower retainer 15 is set smaller than the inner diameter of the collar 11. The bottom surface of the lower mount rubber 13 is vulcanized and adhered to the top surface of the lower retainer 15 in the state in which the axis of the lower mount rubber 13 coincides with the axis of the through hole 15a. A bored part 13a is formed in the lower mount rubber 13, which advances deformation of the lower mount rubber 13. In the center of the top surface of the lower mount rubber 13, a recess part 13b is formed so as to dent downward.

Here, the first predetermined distance Z1 and the second predetermined distance Z2 are defined by, for example, Expression 1 as stated below, where the amplitude caused by the road surface input is represented by Z0, the height variation of the body 3 is represented by σ1, the height variation of the ladder frame 2 is represented by σ2, and the height variation of the first cab mount 10 itself is represented by σ3. In this case, the relation Z1=Z2 is established. The amplitude Z0 by the road surface input is a value obtained by experiments and the like according to the vehicle model. As one example, it is set to 0.5 (mm).

Expression 1 is:

$$Z1(Z2) = Z0 + (\sigma1^2 + \sigma2^2 + \sigma3^2)^{1/2}.$$

The middle mount rubber (muddle-side rubber elastic body) 18 is made of rubber and formed to have a cylindrical shape, whose inner diameter is substantially the same as the outer diameter of the collar 11. The middle mount rubber 18 is formed as a separate body from the upper mount rubber 12 and the lower mount rubber 13, and is vulcanized and adhered to the center part on the outer peripheral surface of the collar 11 in the height direction. In other words, the middle mount rubber 18 is attached to the part on the outer peripheral surface of the collar 11 so as to position between the upper mount rubber 12 and the lower mount rubber 13, as shown in FIG. 5. The thickness of the middle mount rubber 18 is set to a value substantially the same as (or slightly smaller than) the difference between the inner diameter of the attachment hole 2a of the ladder frame 2 and the outer diameter of the collar 11. As shown in FIG. 5, the middle mount rubber 18 makes contact, in a vertically slidable manner, with the inner peripheral surface (hole surface) of the annular wall part 2c of the ladder frame 2 in the state in which the ladder frame 2 is attached to the body 3 with the first cab mount 10. Therefore, the inner peripheral surface of the annular wall part 2c corresponds to a "peripheral surface of the attachment hole" in the present invention. Also as shown in FIG. 5, a folded part 2d may be provided at a lower end part of the annular wall part 2c in order to prevent the middle mount rubber 18 from being damaged by the edge of the annular wall part 2c of the ladder frame 2.

The first cab mount 10 is attached to the body 3 through the following steps: the collar 11 is inserted into the attachment hole 2a of the ladder frame 2; the upper mount rubber 12 and the lower mount rubber 13 are fitted to the collar 11 respectively from the above and from the below so as to sandwich the collar 11 by the upper retainer 14 and the lower retainer 15; then the bolt 16, which is inserted into the attachment hole 3a of the body 3, is furthermore inserted into the through hole 14a, the collar 11, and the through hole 15a in this order (i.e. from the above); and the nut 17, which is screwed with the bolt 16, is tightened. The middle mount rubber 18 is not adhered to the inner peripheral surface of the annular wall part 2c of the ladder frame 2, but makes contact with it in a vertically slidable manner. Thus, the body 3 may appear to be floating in the air when referring to only FIG. 5. However, since the body 3 is also attached to the ladder frame 2 via six cab mounts 20, 30 and 40 other than the first cab mounts 10, it is possible to attach the first cab mount(s) 10 to the body 3 in the state in which the bottom surface of the upper mount rubber 12 is upwardly spaced apart from the top surface of the peripheral part 2b of the ladder frame 2 by the first predetermined distance Z1 as shown in FIG. 5.

The above-described configuration of the first cab mount 10 is different from the configuration of the conventional first cab mount 110 in which the peripheral part 2b of the ladder frame 2 is sandwiched between the upper mount rubber 112 and the lower mount rubber 113. In the first cab mount 10 also, the peripheral part 2b of the ladder frame 2 is positioned between the upper mount rubber 12 and the lower mount rubber 13. However, the upper mount rubber 12 is spaced apart from the ladder frame 2 upwardly by the first predetermined distance Z1 while the lower mount rubber 13 is spaced apart from the ladder frame 2 downwardly by the second predetermined distance Z2. Thus, as shown in FIG. 6, it is possible to reduce the load F caused by the vibration with the amplitude not more than the first and second predetermined distances Z1 and Z2 to zero. In other words, the rigidity and the spring constant of the first cab mount 10 can be brought substantially to zero.

Also, since the inner peripheral surface of the annular wall part 2c of the ladder frame 2 makes contact with the middle mount rubber 18 that is vulcanized and adhered to the outer peripheral surface of the collar 11, it is possible to sustain the load applied in the front and back, and right and left directions so that the load is reduced/attenuated. Furthermore, since the inner peripheral surface of the annular wall part 2c makes contact, in a vertically slidable manner, with the middle mount rubber 18, it is possible to prevent the load applied in the upper-lower direction from being transmitted to the body 3 via the middle mount rubber 18. Also, in the center of the top surface of the lower mount rubber 13, the recess part 13b is formed so as to dent downward. Thus, even when the ladder frame 2 is displaced downward, the annular wall part 2c and the folded part 2d do not touch the lower mount rubber 13 before the bottom surface of the peripheral part 2b of the ladder frame 2 does.

In the first cab mount 10 of this embodiment, the upper mount rubber 12 and the lower mount rubber 13 are respectively spaced apart from ladder frame 2 in the upper-lower direction, and moreover, the inner peripheral surface of the annular wall part 2c of the ladder frame 2 makes contact, in a vertically slidable manner, with the middle mount rubber 18. Therefore, it is possible to prevent the vertical vibration from being transmitted from the ladder frame 2 to the body 3 regardless whether the vibration is in the high frequency range or in the low frequency range. Thus, it is possible to prevent the forcible movement of the body 3 that is generated under the influence of the vertical vibration of the ladder frame 2.

The resonance frequency of the suspension 4 caused by the road surface input when the vehicle travels on a slightly deteriorated paved road is close to the natural frequency of the vehicle 1. However, since the cab mount structure that is capable of reducing the rigidity and the spring constant substantially to zero is applied to the first cab mount 10 that is attached to the body 3 in the vicinity of the suspension 4 provided on the ladder frame 2, it is possible to preferably prevent the forcible movement of the body 3 caused by the vertical vibration close to the natural frequency of the vehicle 1.

Furthermore, when the vibration with the amplitude more than the first and second predetermined distances Z1 and Z2 occurs, the upper mount rubber 12 and the lower mount rubber 13 make contact with the peripheral part 2b of the ladder frame 2 so that they each serve as a stopper. Thus, it is possible to attenuate the vibration while preventing excessive deformation of the ladder frame 2, and also to prevent the strength of the ladder frame 2 from being affected.

—Simulation Experiments—

Here, a description will be given on simulation experiments that were conducted in order to confirm the effects of this embodiment.

In the experiment, vibration levels (dB) at respective feet placing floor parts of the front right sheet and the front left sheet were calculated, assuming that the vehicle traveled with the speed of 40 km/h on a slightly deteriorated paved road that generates the road surface input of 20 Hz or less. Also, the partial overall value (hereinafter referred to as the "POA" value in an abbreviation) was calculated, which was the sum of the vibration levels (dB) in the range of 8 to 20 Hz. The reason why the vibration levels (dB) were calculated at the feet placing floor part but not calculated at the sheet is to prevent the calculation results from being affected by the rigidity of the sheet cushion.

In the Example of the present invention (see the solid lines in FIGS. 7 and 8), the ladder frame 2 was attached to the body 3 via 8 cab mounts, i.e. the first cab mounts 10 having the configuration shown in FIG. 5 and the second to fourth cab mounts 20, 30 and 40. In Comparative Example 1 (see the dashed lines in FIGS. 7 and 8), the ladder frame 2 was attached to the body 3 via 8 cab mounts, i.e. the first cab mounts 110 having the configuration shown in FIG. 13 and the second to fourth cab mounts 20, 30 and 40. Also, in Comparative Example 2 (see the dashed double-dotted lines in FIGS. 7 and 8), the ladder frame 2 was rigidly attached to the body 3 without using the cab mounts.

Figure 7:
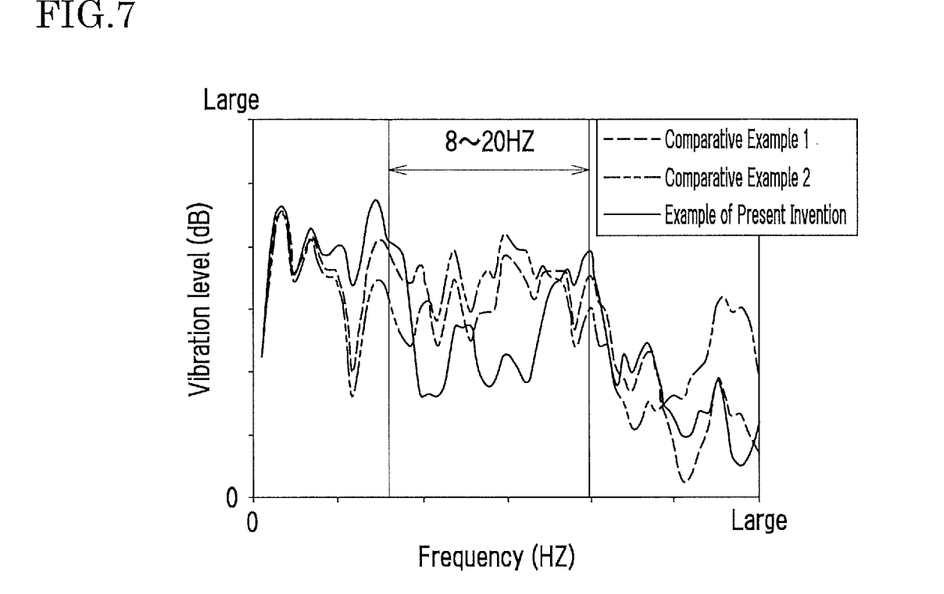
FIG. 7 is a graph schematically indicating the relationship between the frequency and the vibration level at the front right sheet.
Figure 8:
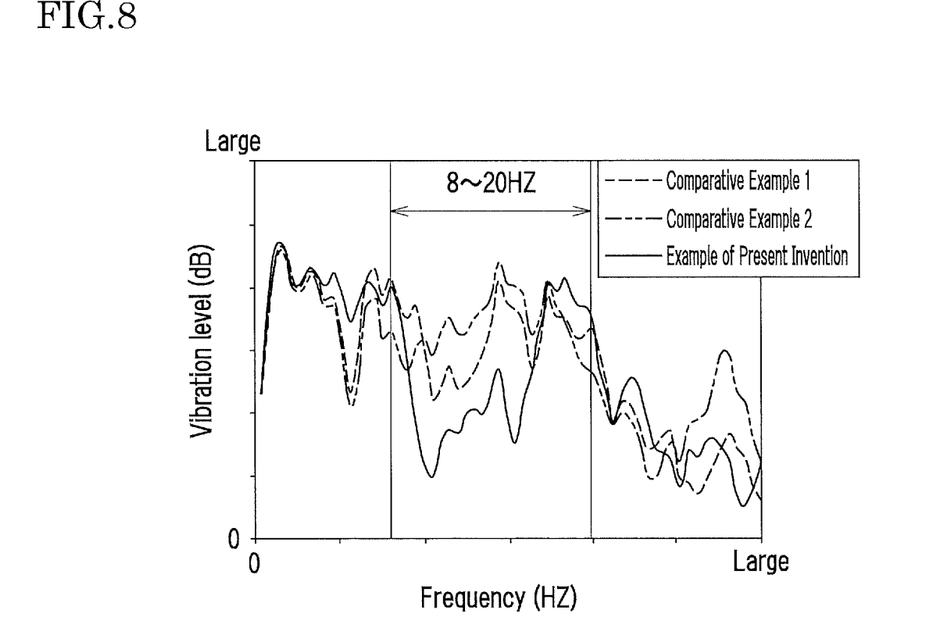
FIG. 8 is a graph schematically indicating the relationship between the frequency and the vibration level at the front left sheet.
Figure 9:
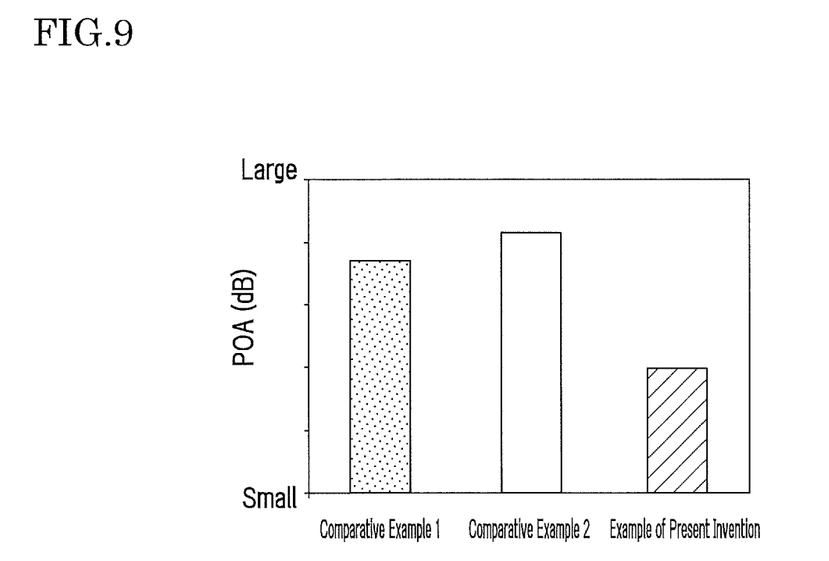
FIG. 9 is a bar graph schematically indicating POA values at the front right sheet.
Figure 10:
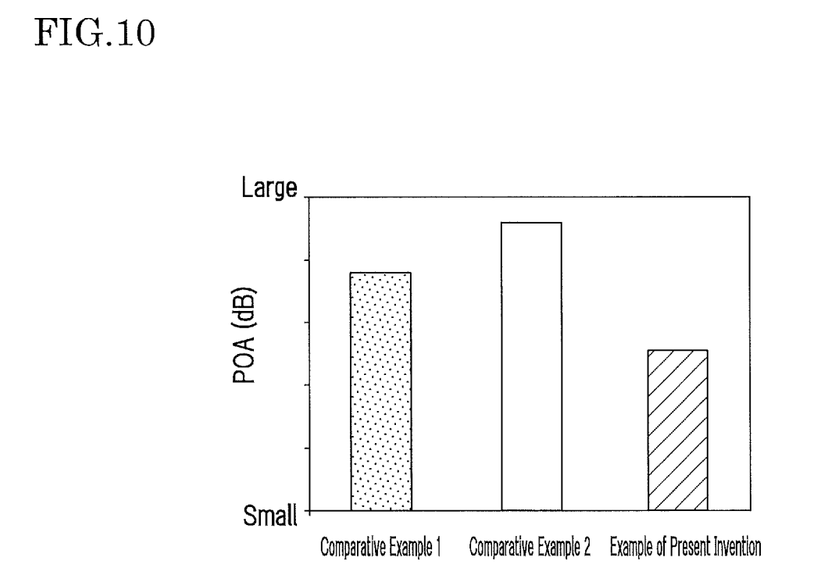
FIG. 10 is a bar graph schematically indicating POA values at the front left sheet.

FIG. 7 is a graph schematically indicating the relationship between the frequency (Hz) and the vibration level (dB) at the front right sheet. FIG. 8 is a graph schematically indicating the relationship between the frequency (Hz) and the vibration level (dB) at the front left sheet. FIG. 9 is a bar graph schematically indicating the POA values at the front right sheet. FIG. 10 is a bar graph schematically indicating the POA values at the front left sheet.

As shown in FIGS. 7 and 8, in Comparative Example 1 using the conventional first cab mounts 110 that sandwiches the ladder frame 2 in the upper-lower direction by the upper mount rubber 112 and the lower mount rubber 113, the vibration level (dB) in the frequency range of 8 to 20 Hz (i.e. close to the natural frequency of the vehicle 1) was overall reduced compared to Comparative Example 2 in which the ladder frame 2 was rigidly attached to the body 3. However, the vibration level (dB) was not considerably reduced.

Accordingly, in Comparative Example 1, the POA value in the frequency range of 8 to 20 Hz (i.e. close to the natural frequency of the vehicle 1) was not considerably reduced at both the front right sheet and the front left sheet compared to Comparative Example 2, as shown in FIGS. 9 and 10.

In contrast to the above, in the Example of the present invention using the first cab mount 10 of this embodiment, it was confirmed that the vibration level (dB) in the frequency range of 8 to 20 Hz (i.e. close to the natural frequency of the vehicle 1) was overall and considerably reduced as shown in FIGS. 7 and 8, compared to Comparative Examples 1 and 2.

Accordingly, in the Example of the present invention, the POA value in the frequency range of 8 to 20 Hz (i.e. close to the natural frequency of the vehicle 1) was considerably reduced (specifically, by about 2 (dB)) at both the front right sheet and the front left sheet compared to Comparative Examples 1 and 2, as shown in FIGS. 9 and 10.

—Variation—

Here, a Variation of the above first embodiment will be described. In this Variation, the shape of a middle mount rubber 19 differs from that in the above first embodiment. Hereinafter, differences from the first embodiment will be mainly described.

Figure 11:
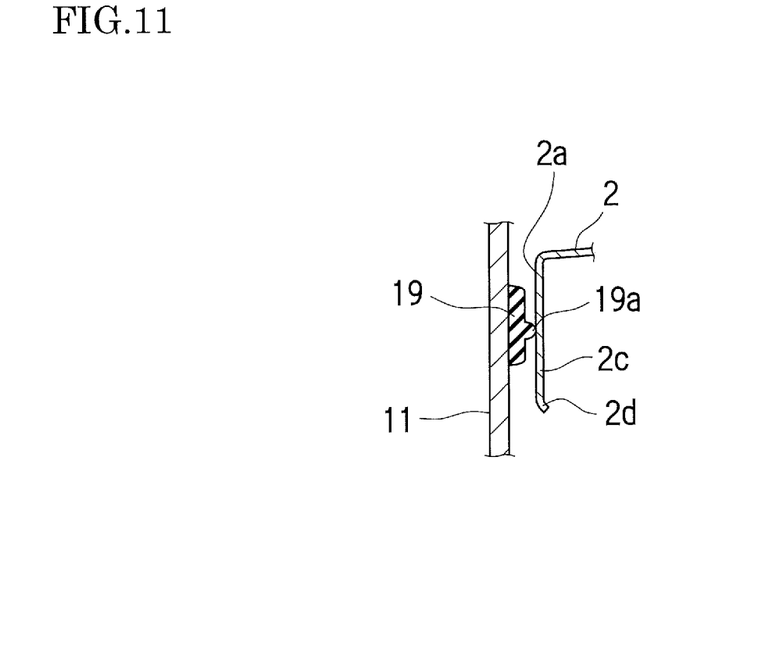
FIG. 11 is an enlarged view schematically illustrating the relationship between a middle mount rubber and the ladder frame.

FIG. 11 is an enlarged view schematically illustrating the relationship between the middle mount rubber 19 and the ladder frame 2. The middle mount rubber (middle-side rubber elastic body) 19 of this Variation is made of a rubber material so as to have a cylindrical shape, and is vulcanized and adhered to the center part on the outer peripheral surface of the collar 11 in the height direction, similarly to the middle mount rubber 18 in the first embodiment. However, unlike the middle mount rubber 18, a protrusion 19a extending outward in the diameter direction is provided at the center part of the outer peripheral surface of the middle mount rubber 19 in the height direction, in such a manner that the protrusion 19a surrounds the middle mount rubber 19, as shown in FIG. 11.

The inner peripheral surface (peripheral surface of the attachment hole) of the annular wall part 2c of the ladder frame 2 makes contact, in a vertically slidable manner, with the protrusion 19a. That is, in above the first embodiment, the inner peripheral surface of the annular wall part 2c of the ladder frame 2 makes surface contact with the middle mount rubber 18. In contrast, in this Variation, the inner peripheral surface of the annular wall part 2c of the ladder frame 2 makes contact with the protrusion 19a of the middle mount rubber 19 in a manner rather similar to the point contact.

As described above, in this Variation, the inner peripheral surface of the annular wall part 2c of the ladder frame 2 makes vertically slidably contact with the protrusion 19a of the middle mount rubber 19 in a manner rather similar to the point contact. Thus, it is possible to further prevent the vertical vibration of the ladder frame 2 from being transmitted to the body 3 via the middle mount rubber 19.

Also in this Variation, since the inner peripheral surface of the annular wall part 2c of the ladder frame 2 makes contact with the protrusion 19a of the middle mount rubber 19 that is vulcanized and adhered to the outer peripheral surface of the collar 11, it is possible to sustain the load applied in the front and back, and right and left directions so that the load is reduced/attenuated. Furthermore as shown in FIG. 11, the folded part 2d may be provided at the lower end part of the annular wall part 2c in order to prevent the middle mount rubber 19 from being damaged by the edge of the annular wall part 2c of the ladder frame 2.

Second Embodiment

Figure 12:
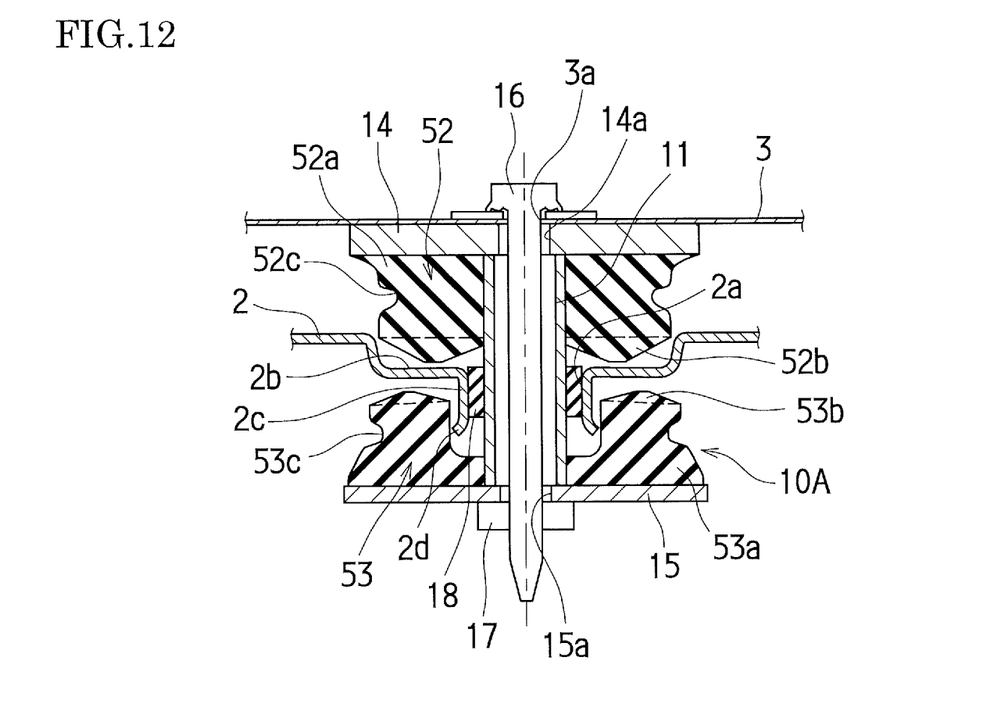
FIG. 12 is a cross-sectional view schematically illustrating the first cab mount according to the second embodiment of the present invention.

In this embodiment, the respective shapes of an upper mount rubber 52 and a lower mount rubber 53 differ from those in the above first embodiment. Hereinafter, the common configuration with the first embodiment is indicated by the same reference signs, and the detail description thereof is omitted. Differences from the first embodiment will be mainly described.

FIG. 12 is a cross-sectional view schematically illustrating a first cab mount 10A according to this embodiment. Note that in FIG. 12, the respective heights of a lower annular part 52b and an upper annular part 53b (both are described later) are exaggeratedly illustrated for the sake of visibility. As shown in FIG. 12, the first cab mount 10A includes: the collar 11; the upper mount rubber 52; the lower mount rubber 53; the upper retainer 14; the lower retainer 15; the bolt 16; the nut 17 and the middle mount rubber 18.

As shown in FIG. 12, the lower end part of the upper mount rubber (upper-side rubber elastic body) 52, which faces the peripheral part 2b of the ladder frame 2, is formed such that the horizontal cross section area thereof gradually decreases downward and that the lower end thereof is spaced apart from the top surface of the peripheral part 2b of the ladder frame 2 in the upper-lower direction.

More specifically, the upper mount rubber 52 made of rubber is formed thick and to have a substantially cylindrical shape, and has: an upper mount body 52a (a part on the upper side of the dashed line in the upper mount rubber 52) whose top surface is vulcanized and adhered to the bottom surface of the upper retainer 14; and the lower annular part 52b that extends downward from the upper mount body 52a and that has a substantially inverted triangular cross-section. The upper mount body 52a is formed to have a shape substantially the same as the upper mount rubber 12 of the first embodiment. That is, the upper mount rubber 52 is formed to have a shape in which part of the space between the bottom surface of the upper mount rubber 12 and the top surface of the peripheral part 2b of the ladder frame 2 (i.e. part of the space corresponding to the first predetermined distance Z1) in the first embodiment is occupied by the lower annular part 52b. A bored part 52c is formed in the upper mount rubber 52, which advances deformation of the upper mount rubber 52.

On the other hand, the upper end part of the lower mount rubber (lower-side rubber elastic body) 53, which faces the peripheral part 2b of the ladder frame 2, is formed such that the horizontal cross section area thereof gradually decreases upward and that the upper end thereof is spaced apart from the bottom surface of the peripheral part 2b of the ladder frame 2 in the upper-lower direction.

More specifically, the lower mount rubber 53 made of rubber is formed thick and to have a substantially cylindrical shape, and has: a lower mount body 53a (a part on the lower side of the dashed line in the lower mount rubber 53) whose bottom surface is vulcanized and adhered to the top surface of the lower retainer 15; and the upper annular part 53b that extends upward from the lower mount body 53a and that has a substantially triangular cross-section. The lower mount body 53a is formed to have a shape substantially the same as the lower mount rubber 13 of the first embodiment. That is, the lower mount rubber 53 is formed to have a shape in which part of the space between the top surface of the lower mount rubber 13 and the bottom surface of the peripheral part 2b of the ladder frame 2 (i.e. part of the space corresponding to the second predetermined distance Z2) in the first embodiment is occupied by the upper annular part 53b. A bored part 53c is formed in the lower mount rubber 53, which advances deformation of the lower mount rubber 53.

In the above-described configuration of the first cab mount 10A, the lower end of the upper mount rubber 52 and the upper end of the lower mount rubber 53 are respectively spaced apart from the peripheral part 2b of the ladder frame 2 in the upper-lower direction. Thus, the rigidity and the spring constant of the first cab mount 10A can be brought substantially to zero until the ladder frame 2 comes in contact with the upper mount rubber 52 and the lower mount rubber 53.

Also, the horizontal cross section area of the lower annular part 52b is formed so as to gradually decrease downward while the horizontal cross section area of the upper annular part 53b is formed so as to gradually decrease upward. Thus, the respective amounts of rubber of the upper mount rubber 52 and the lower mount rubber 53 are minimized at the respective parts of the upper mount rubber 52 and the lower mount rubber 53 closest to the peripheral part 2b of the ladder frame 2. Therefore, at the beginning of the contact of the ladder frame 2 with the upper mount rubber 52 and the lower mount rubber 53, the rigidity and the spring constant of the first cab mount 10A can be reduced substantially close to zero.

Therefore, it is possible to reliably prevent the vertical vibration from being transmitted from the ladder frame 2 to the body 3 during the period from the start of the vertical vibration of the ladder frame 2 to the initial time of contact with the upper mount rubber 52 and the lower mount rubber 53. Thus, it is possible to prevent the forcible movement of the body 3 that is generated under the influence of the vertical vibration of the ladder frame 2.

On the other hand, the respective horizontal cross section areas of the lower annular part 52b and the upper annular part 53b (in other words, the respective amounts of rubber thereof) gradually increase as the horizontal cross section areas are spaced apart from the ladder frame 2. Accordingly, when the vertical vibration with a relatively large amplitude occurs, the load is sustained with relatively large rigidity and spring constant. Thus, it is possible to attenuate the vibration while preventing excessive deformation of the ladder frame 2, and also to prevent the strength of the ladder frame 2 from being affected.

Other Embodiments

The present invention is not limited to the above-described embodiments, and may be embodied in other forms without departing from the gist or essential characteristics thereof.

In the above-described embodiments, the present invention was applied to the first cab mounts 10 and 10A in the vicinity of the suspension 4. However, the present invention is not limited thereto. According to the vibration mode and the like, it may be applied to the second to fourth cab mounts 20, 30 and 40.

Also, in the above-described first embodiment, the amplitude Z0 by the road surface input was set to 0.5 (mm) and furthermore the first predetermined distance Z1 and the second predetermined distance Z2 were defined by the Expression 1. However, these values were exemplarily shown. The first predetermined distance Z1 and the second predetermined distance Z2 may be most suitably set based on a different expression, taking into account, for example, the strength of the body 3 and the ladder frame 2. In such a case, the expression Z1 Z2 may be accepted.

Furthermore, in the above-described second embodiment, the middle mount rubber 18 was used. However, the present invention is not limited thereto. The middle mount rubber 19 having the protrusion 19a may be used, similarly to the Variation of the first embodiment.

Also in the second embodiment, the lower end of the upper mount rubber 52 and the upper end of the lower mount rubber 53 were respectively spaced apart from the peripheral part 2b of the ladder frame 2 in the upper-lower direction. However, the present invention is not limited thereto. The lower end of the upper mount rubber 52 and the upper end of the lower mount rubber 53 may make contact with the peripheral part 2b of the ladder frame 2. In this case also, the respective amounts of rubber of the upper mount rubber 52 and the lower mount rubber 53 are minimized at the lower end of the upper mount rubber 52 and the upper end of the lower mount rubber 53 that are closest to the peripheral part 2b of the ladder frame 2. Thus, the rigidity and the spring constant of the first cab mount 10A can be reduced substantially close to zero.

The foregoing embodiments are therefore to be considered in all respects as illustrative and not limiting. Furthermore, all modifications and changes that come within the meaning and range of equivalency of the claims are intended to be embraced therein.

INDUSTRIAL APPLICABILITY

With the present invention having a simple configuration, it is possible to prevent a forcible movement of the body, which is generated under the influence of vertical vibration of the frame. Therefore, the present invention can be suitably and beneficially applied to a cab mount that attaches the frame to the body.

REFERENCE SIGNS LIST

1 Vehicle
2 Ladder frame
2a Attachment hole
2b Peripheral part
3 Body
4 Suspension
10 First cab mount
11 Collar
12 Upper mount rubber (upper-side rubber elastic body)
13 Lower mount rubber (lower-side rubber elastic body)
18 Middle mount rubber (middle-side rubber elastic body)
19 Middle mount rubber (middle-side rubber elastic body)
19a Protrusion
53b Upper mount rubber (upper-side rubber elastic body)
52b Lower annular part (lower end part)
53 Lower mount rubber (lower-side rubber elastic body)
53b Upper annular part (upper end part)
Z1 First predetermined distance
Z2 Second predetermined distance

What is claimed is:

1. A cab mount comprising: a collar extending vertically; and an upper-side rubber elastic body and a lower-side rubber elastic body disposed so as to face each other in an upper-lower direction on an outer periphery of the collar, the collar being configured to be attached to a body of a vehicle by being inserted into an attachment hole formed in a frame of the vehicle while a peripheral part of the attachment hole is positioned between the upper-side rubber elastic body and the lower-side rubber elastic body, wherein the upper-side rubber elastic body is spaced apart from the frame in the upper-lower direction by a first predetermined distance while the lower-side rubber elastic body is spaced apart from the frame in the upper-lower direction by a second predetermined distance, wherein a middle-side rubber elastic body, which is a separate body from the upper-side rubber elastic body and the lower-side rubber elastic body, is attached to an outer peripheral surface of the collar between the upper-side rubber elastic body and the lower-side rubber elastic body so as to surround the outer peripheral surface, and a peripheral surface of the attachment hole makes contact with the middle-side rubber elastic body in a vertically slidable manner, and wherein a protrusion extending outward in a diameter direction is provided on the middle-side rubber elastic body so as to surround the middle-side rubber elastic body, and the peripheral surface of the attachment hole makes contact with the protrusion in a vertically slidable manner.

2. A cab mount comprising: a collar extending vertically; and an upper-side rubber elastic body and a lower-side rubber elastic body disposed so as to face each other in an upper-lower direction on an outer periphery of the collar, the collar being configured to be attached to a body of a vehicle by being inserted into an attachment hole formed in a frame of the vehicle while a peripheral part of the attachment hole is positioned between the upper-side rubber elastic body and the lower-side rubber elastic body, wherein a lower end part of the upper-side rubber elastic body, which faces the peripheral part of the frame, is formed such that a horizontal cross section area of the lower end part gradually decreases downward, and an upper end part of the lower-side rubber elastic body, which faces the peripheral part of the frame, is formed such that a horizontal cross section area of the upper end part gradually decreases upward, wherein a middle-side rubber elastic body, which is a separate body from the upper-side rubber elastic body and the lower-side rubber elastic body, is attached to an outer peripheral surface of the collar between the upper-side rubber elastic body and the lower-side rubber elastic body so as to surround the outer peripheral surface, and a peripheral surface of the attachment hole makes contact with the middle-side rubber elastic body in a vertically slidable manner, and wherein a protrusion extending outward in a diameter direction is provided on the middle-side rubber elastic body so as to surround the middle-side rubber elastic body, and the peripheral surface of the attachment hole makes contact with the protrusion in a vertically slidable manner.

3. The cab mount according to claim 2, wherein a lower end of the upper-side rubber elastic body is spaced apart from the frame in the upper-lower direction while an upper end of the lower-side rubber elastic body is spaced apart from the frame in the upper-lower direction.

4. The cab mount according to claim 1, wherein the cab mount is attached to the body in a vicinity of a suspension provided on the frame.

5. The cab mount according to claim 2, wherein the cab mount is attached to the body in a vicinity of a suspension provided on the frame.

\* \* \* \* \*